July 5, 1932.  H. JASON  1,866,470
COUPLING FOR WIRE ROPES
Filed Aug. 10, 1931
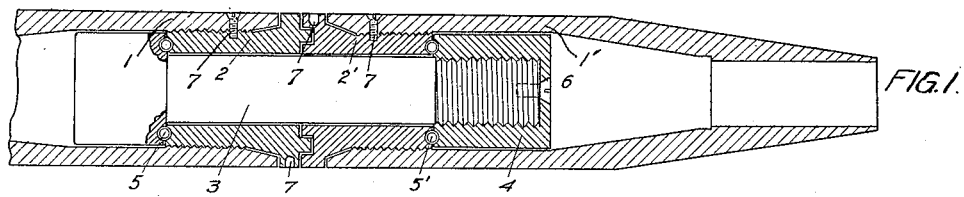
FIG. 1.
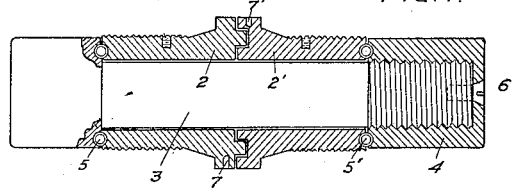
FIG. 2.
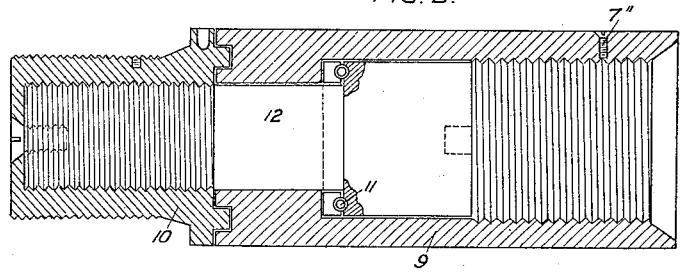
FIG. 3.
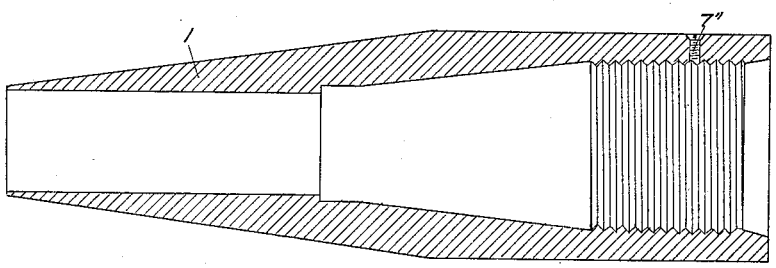
FIG. 4.
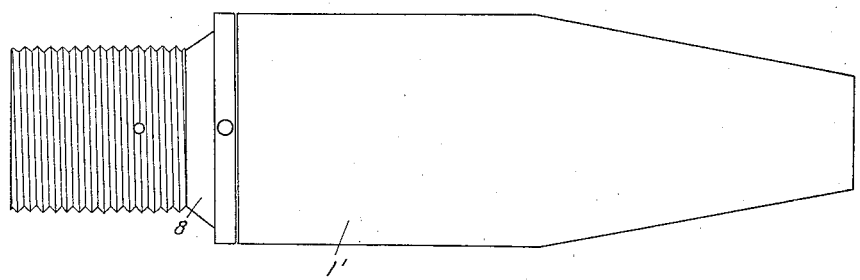
INVENTOR
Hellmuth Jason
BY
ATTORNEYS Patented July 5, 1932

1,866,470

UNITED STATES PATENT OFFICE

HELLMUTH JASON, OF COTO MENAS, SERON, SPAIN

COUPLING FOR WIRE ROPES

Application filed August 10, 1931, Serial No. 556,277, and in Germany August 11, 1930.

The invention relates to couplings for ropes (cables) such as are used, for example, for connecting the supporting cables (carrying ropes) for aerial cable ways. In this connection each of the two ends of the ropes are introduced into one side of the sleeve of the coupling, opened out within the coupling, forced apart by rings or the like, or soldered with a special alloy. In this manner practically an extremely rigid connection up to 100 per cent of the strength of the rope is attained, and it is impossible for the rope to become loose. In order to effect the keying or soldering the sleeve must be made in two parts, since otherwise the interior is not accessible. For this purpose the two parts are screwed together by means of a third part which is provided with an external right- and left-handed thread. It is difficult in making the coupling to screw on both threads exactly simultaneously so that the two parts of the sleeve are uniformly drawn together.

It has been shown, also, that in consequence of the twisting of the rope in the neighbourhood of the coupling the ropes are always rotated and distorted and are liable to be very quickly worn out. This is due to the rigidity of the coupling relatively to that of the rope, since the latter always tends to be twisted as soon as a trolley wagon or travelling crab runs over it. This often leads to the rope being broken, and it has then been determined practically that the greater number of the breakages in the rope occur in the neighbourhood of the rigid couplings. These twists also cause the drawback that they set up, a certain amount of stress in the rope, so that when the coupling is released, for the purpose of exchanging the rope, the end of the rope readily flies out and the tackle is very much entangled by the twist. The flying out of the ends of the rope obviously constitutes a considerable danger for the operators.

The invention consists in a coupling which is free from these drawbacks, and which avoids the objectionable twist. For this purpose, the two ends of the sleeve parts are arranged by means of end bearings (thrust bearings) so as to be relatively rotatable; in this way the mounting is easily effected without danger, and by avoiding any torsion a longer life is imparted to the rope.

The accompanying drawing represents, in Figs. 1 and 1a, longitudinal sections through a coupling according to the invention.

Figs. 2, 3 and 4 show the details of a modified form of coupling.

The coupling has, as shown in Fig. 1, two sleeves, to the ends of which the ropes are introduced, opened out, keyed or soldered in the same manner as in the known couplings. The coupling also consists of two threaded bushings 2, 2′ which are interfitted by means of a structure consisting of annular grooves and flanges on the confronting ends for the better guiding and prevention of lateral displacement of the bushings, and are held together by a bolt 3 with a nut 4. This bolt constitutes a double-headed tie member which connects the bushings 2, 2′ with sufficient looseness to enable free relative turning of the bushings and consequently of the sleeves 1, 1″, this turning being greatly facilitated by certain thrust bearings. Ball bearings 5, 5′ are provided between the outer ends of the bushings 2, 2′ and the inner sides of the head of the bolt and of the nut 4, forming the thrust bearings just mentioned. Both threaded parts are provided with right-hand threads, in contrast to the known rigid constructions having right- and left-hand threads. The pull of the rope passes, in the coupling according to the invention, from the sleeve 1 to the bushing 2, over the ball bearings 5 to the bolt 3 and the nut 4, over the ball bearings 5′ to the bushing 2′ and from there to the sleeve 1′.

The mounting is effected in the following manner: After the ends of the rope have been fastened in the sleeves in the usual manner, the bushings 2, 2′ are fitted together and secured by the bolt 3 and a set screw 6, and one of the two bushings is screwed in the corresponding sleeve by means of a key engaging in a hole 7 or 7′. The other bushing is then screwed on also by means of a key in the hole 7 or 7′, the first bushing and the corresponding sleeve being held fast to prevent turning.

In the construction shown in Figs. 2, 3 and 4, a known coupling is provided with a connecting part according to the invention. In this way coupling connections, previously prepared, can, with couplings according to the invention, be provided in a rope without exchanging the sleeves. The right and left threads can be used in this case, but they need not be operated simultaneously. Also, when the couplings are correspondingly constructed, two right or two left-hand threads can be employed.

After the nipple 8 has been firmly screwed into the sleeve 1', the bushing 9, which has been screwed up with the bolt 12, ball bearing 11 and nut 10, is screwed on the nipple 8. Finally, the threaded part 10 is screwed into the sleeve 1, the bushing 9 and the sleeve 1' being held stationary, the ball bearing 11 allowing this relative rotation. The pull of the rope now passes from the sleeve 1 to the threaded portion 10, which forms a nut for the bolt 12, over the ball bearing 11, bushing 9, nipple 8 to the sleeve 1'.

As in the known constructions and in all heavily loaded threads, all the threaded parts can be secured as shown at 7'', although these parts, due to the arrangement of the ball bearings in the coupling, are not liable to be loosened.

What I claim is:—

1. In a coupling having a pair of sleeves to fixedly receive two rope ends; bushings secured to the adjacent ends of the sleeves, said bushings having inherent interfitting structures on the near ends providing a guide for one bushing in respect to the other, a double-headed tie member loosely connecting the bushings, the heads of said tie member confronting the remote ends of the bushings, and thrust bearings interposed between said remote bushing ends and heads to enable free turning of one sleeve in respect to the other.

2. In a coupling having a pair of sleeves to fixedly receive two rope ends; bushings secured to the adjacent ends of the sleeves, the near ends of the bushings having interfitting annular sleeves and flanges, the remote ends forming supports for anti-friction means, a double-headed tie member loosely connecting the bushings, those peripheral portions of the heads which confront the said remote ends of the bushings also forming supports for anti-friction means, and anti-friction means interposed between said last mentioned supports and the remote ends.

In testimony whereof I affix my signature.

HELLMUTH JASON.